US008670896B2

(12) United States Patent
Hodorek et al.

(10) Patent No.: US 8,670,896 B2
(45) Date of Patent: Mar. 11, 2014

(54) PORTABLE PEDAL MEASUREMENT APPARATUS

(75) Inventors: Craig Thomas Hodorek, Dearborn, MI (US); Skip Frosty, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 13/427,225

(22) Filed: Mar. 22, 2012

(65) Prior Publication Data

US 2013/0253761 A1  Sep. 26, 2013

(51) Int. Cl.
*G01M 17/00* (2006.01)

(52) U.S. Cl.
USPC .............................. 701/33.2; 701/32.8; 73/132

(58) Field of Classification Search
None
See application file for complete search history.

(56) References Cited

U.S. PATENT DOCUMENTS

| 3,662,593 | A |   | 5/1972 | Pirrello et al. |   |
|---|---|---|---|---|---|
| 3,877,299 | A | * | 4/1975 | Clayton et al. | 73/132 |
| 3,977,241 | A |   | 8/1976 | Asmus et al. |   |
| 5,012,689 | A |   | 5/1991 | Smith |   |
| 5,483,825 | A |   | 1/1996 | Greenbaum |   |
| 7,021,131 | B2 | * | 4/2006 | Harrison et al. | 73/132 |
| 2011/0130935 | A1 | * | 6/2011 | Krueger et al. | 701/70 |

FOREIGN PATENT DOCUMENTS

| CN | 2035880 | U | 4/1989 |
| JP | 2010197182 | A | 9/2010 |

OTHER PUBLICATIONS

Home/Pedal Force Measurement, About Load Star Sensors, Digital Load Cells, Load Cells Solutions, Pedal Force Testing, Copyright 2011.

* cited by examiner

*Primary Examiner* — Michael J Zanelli
(74) *Attorney, Agent, or Firm* — Raynold L. Coppiellie; Brooks Kushman P.C.

(57) ABSTRACT

A portable measurement apparatus is provided for measuring the load required to depress a foot pedal and the change in angular position of the foot pedal. A load plate is connected through at least one load cell to a pedal plate that engages a foot pedal. A linear motion driver is adjustably retained on the measurement apparatus to accommodate different types of foot pedals. A rotary encoder with an extendable cable is used to measure scrub throughout the range of movement of the foot pedal.

12 Claims, 3 Drawing Sheets

PORTABLE PEDAL MEASUREMENT APPARATUS

TECHNICAL FIELD

This disclosure relates to a tool and system for measuring foot pedal, and in particular accelerator pedal, performance characteristics.

BACKGROUND

Ergonomic aspects of vehicle controls are important to vehicle design. Foot pedals are actuators that are used to control brakes, acceleration and clutch engagement. Accelerator pedals are particularly important for driver comfort because they are substantially continuously contacted by the driver's foot whenever a vehicle is operated.

Factors that must be considered in the design of foot pedals include the angle of inclination, the force required to depress the pedal, and the sliding, or scrub, of a driver's shoe across the face of the pedal. These factors are important throughout the full range of movement of the pedal to assure driver comfort and vehicle response. Accelerator pedals are typically elongated members and a substantial portion of the pedal may be contacted by the driver's foot.

Testing devices for pedal operation generally consist of a single point contact that is operatively connected to a load cell. Such devices provide limited information regarding the force required to depress the pedal at the single point of engagement.

The above problems and other problems are addressed by this disclosure as summarized below.

SUMMARY

A pedal measurement apparatus is provided for a vehicle having a traction motor controlled by an accelerator pedal that controls a speed request output signal. The apparatus includes a base and a pedal plate that is connected to the base by a pivot connector. The pedal plate has a surface that is oriented to engage the accelerator pedal. A rotary potentiometer is operatively connected between the pedal plate and the base that provides an inclination signal representative of the angular position of the pedal plate surface. A load plate is attached to at least one load cell that is attached to the pedal plate. A linear motion driver is actuated by a motor and is attached to a pedal bracket to move the pedal plate between a retracted position and an extended position. The load plate provides a load signal that is representative of the load applied by the linear motion driver to the pedal plate. A controller receives the speed request output signal and correlates the speed request signal output to the force applied to the accelerator pedal and the inclination signal.

According to other aspects of the pedal measurement apparatus, an inclinometer may be attached to the pedal to measure the position of the pedal in the initial, non-depressed, or retracted position. The speed request signal provides a variable voltage signal to the traction motor that varies based upon the position of the pedal. The pedal measurement apparatus may further comprise an adjustment plate attached to the base that extends vertically above the base with the linear motion driver being attached to the adjustment plate in a range of vertically spaced positions above the base. The pedal measurement apparatus may also further comprise a bracket that secures the linear motion driver to the adjustment plate in a range of horizontally spaced positions relative to the pedal bracket.

Further aspects of the pedal measurement apparatus may comprise a revolution per minute (RPM) signal representative of the speed of rotation of the engine that is obtained from a sensor or CAN BUS source on the vehicle. The RPM signal is provided to the controller for correlation with the speed request signal output, the inclination signal, and the load signal to the RPM signal.

The pedal measurement apparatus may further comprise a rotary encoder having an elongated cable that is extended from the rotary encoder when the pedal plate is driven into engagement with the accelerator pedal and retracted from the rotary encoder when the pedal plate is withdrawn from the accelerator pedal. The distal end of the elongated cable is attached to a fixed point on the pedal plate and a cable guide is attached to the base plate proximate the pivot connector. The rotary encoder measures the distance that the cable is extended or retracted as the pedal plate is moved from an initial position to a wide open position and provides a scrub signal to the controller. A sleeve may be attached to the base for guiding the cable from the rotary encoder to the cable guide.

A method of measuring ergonomic parameters relating to a foot pedal in a vehicle with a portable measurement apparatus as described above, wherein method comprises placing the measurement apparatus on the floor of the vehicle, and placing the pedal plate at a specified fixed distance from engagement with the foot pedal and adjusting the angular orientation of the pedal plate to be parallel to the foot pedal. Connecting the speed request output signal to the controller and actuating the linear motion driver to move the foot pedal from a non-depressed position to a fully depressed position. The load signal and the inclination signal are provided to the controller from at least one load cell and the potentiometer as the foot pedal is moved from the non-depressed position to the fully depressed position.

According to other aspects of the method, the measurement apparatus may further comprise a rotary encoder having an elongated cable that is extended from the rotary encoder when the pedal plate is driven into engagement with the accelerator pedal and retracted from the rotary encoder when the pedal plate is withdrawn from the accelerator pedal. A distal end of the elongated cable is attached to a fixed point on the pedal plate, and a cable guide is attached to the base plate proximate the pivot connector. The method further comprises measuring the distance that the cable is extended or retracted as the pedal plate is moved from the non-depressed position to the fully depressed position to provide a scrub measurement value.

According to another aspect of the method, the measurement apparatus may further include providing an inclinometer that is attached to the pedal, and the method may further comprise measuring the angular orientation of the pedal in the non-depressed position with the inclinometer.

The above aspects of the method and apparatus and other aspects will be better understood in view of the attached drawings and the following detailed description of the illustrated embodiments of the disclosure.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
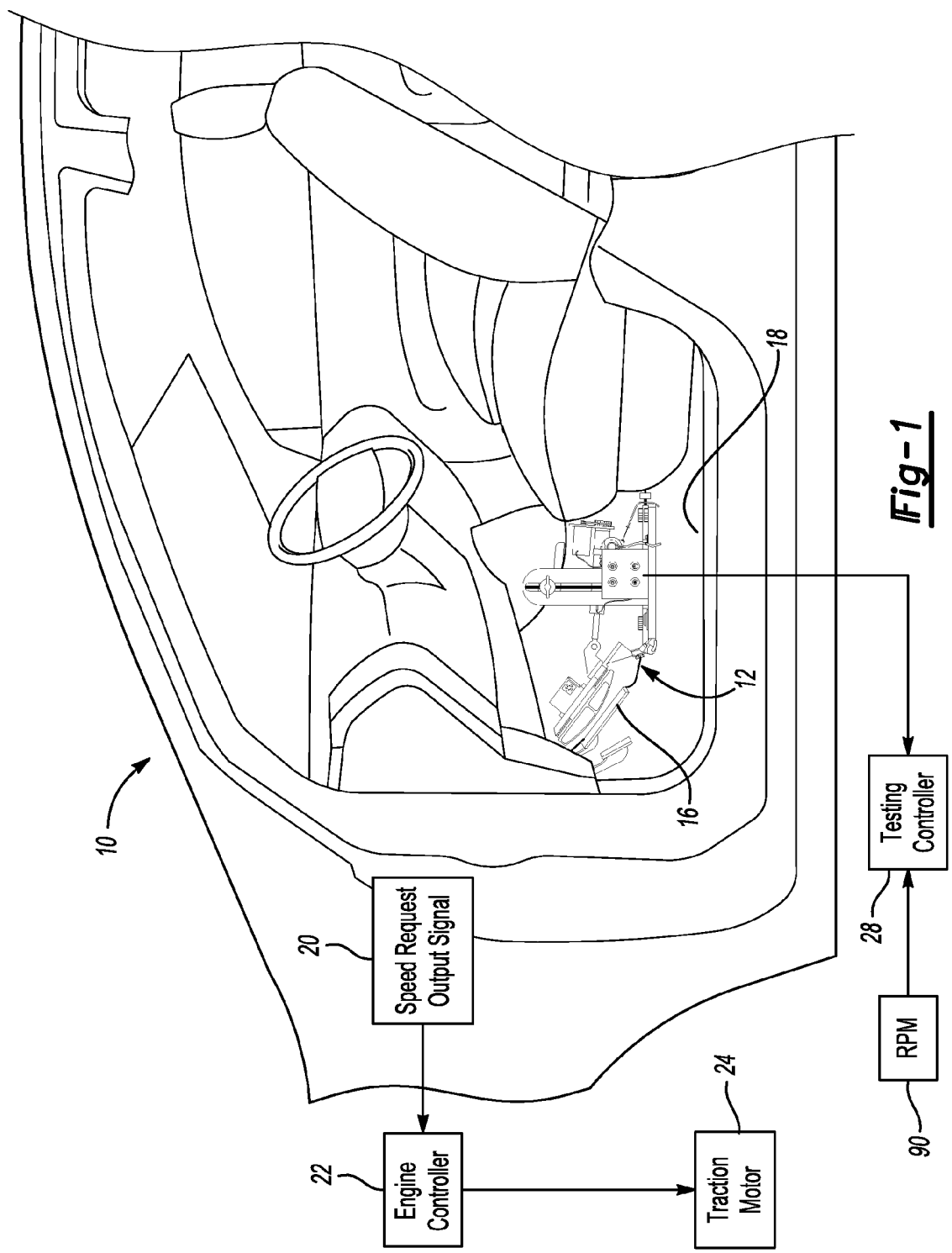
FIG. 1 is a fragmentary side elevation view of a vehicle with a portable measurement apparatus made according to one embodiment of the present invention.

Referring to FIG. 1, a vehicle 10 is shown with a portable measurement apparatus 12 in position to measure changes in load, angular orientation and scrub as the foot pedal 16 is depressed to a fully depressed position or returned to a non-depressed position. The measurement apparatus 12 is placed on a floor 18 of the vehicle 10. A speed request output signal 20 that is generated in normal vehicle operation as an accelerator foot pedal 16 is depressed and released. The speed request output signal 20 is provided to an engine controller 22. The engine controller 22, in turn, signals the traction motor 24 of the vehicle 10 to either increase or decrease speed depending upon the position of the foot pedal 16. A testing controller 28, for example a lap top computer with a data acquisition system, is provided to generate control signals and receive data and correlate the data for reports or displays, for example, on a handheld digital display device or on the lap top computer that serves as the testing controller 28.

Figure 2:
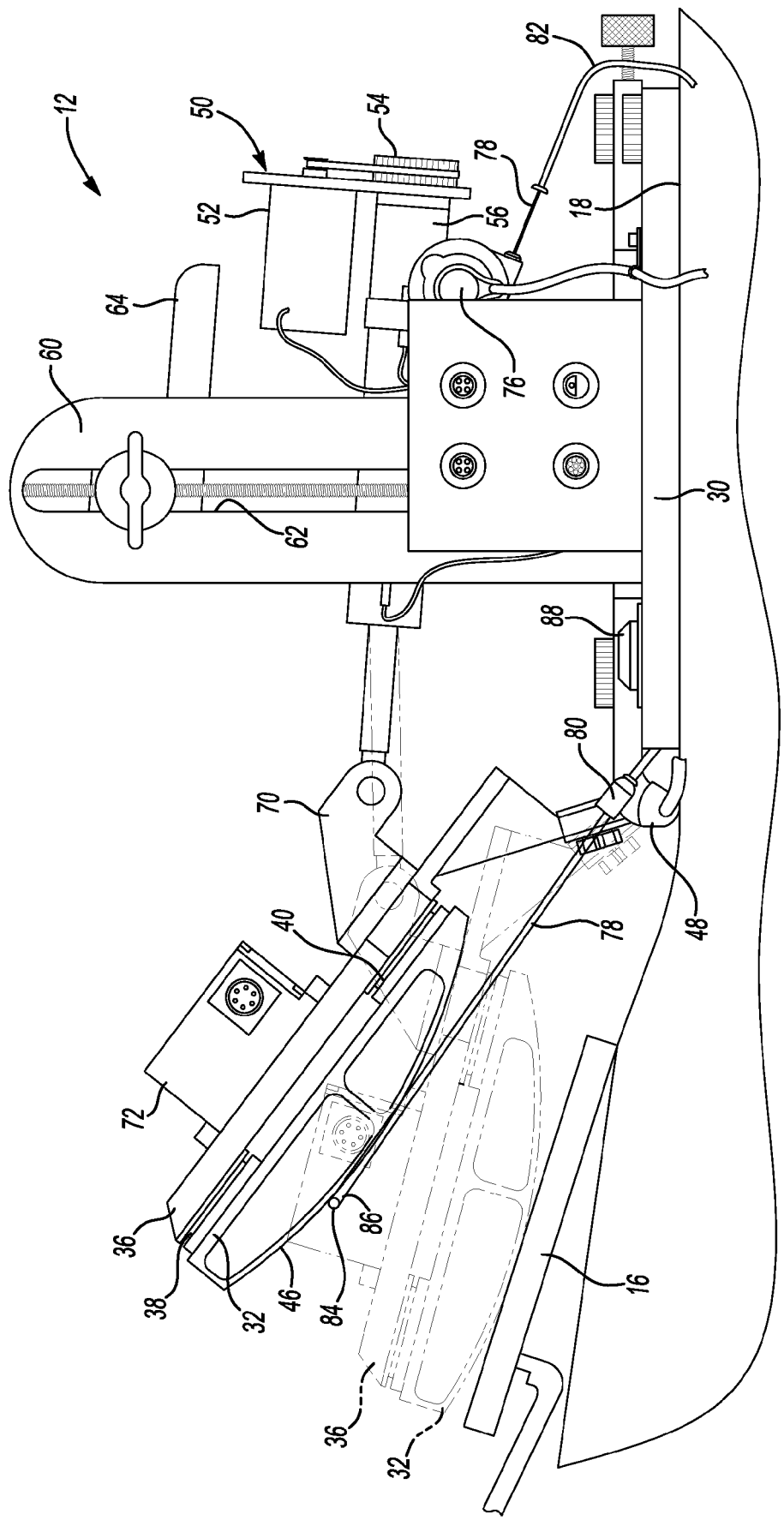
FIG. 2 is a fragmentary side elevation view of the portable measurement apparatus shown in FIG. 1.
Figure 3:
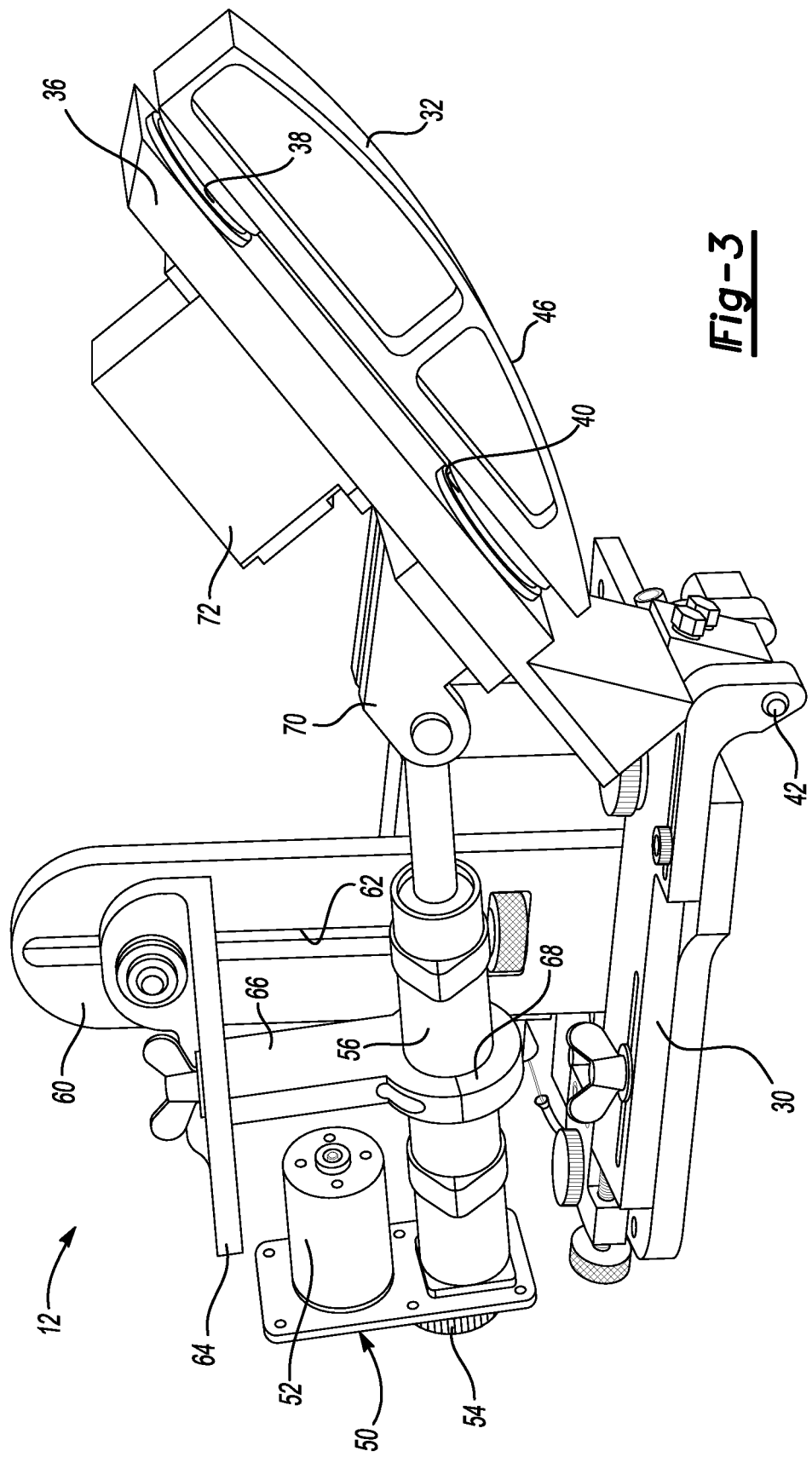
FIG. 3 is a side/front perspective view of the portable measurement apparatus shown in FIG. 1.

Referring to FIGS. 2 and 3, the measurement apparatus 12 is shown in greater detail. The measurement apparatus 12 includes a base 30 that is placed on the floor 18 of the vehicle 10 (as shown in FIG. 1). The base 30 may have pins, feet or other adjustable elements that are used to level the base 30. A pedal plate 32 is pivotally attached to the base 30. A load plate 36 is attached to the pedal plate 32 with an upper load cell 38 and a lower load cell 40 being disposed between the load plate 36 and the pedal plate 32. A pivot connector 42 connects the pedal plate 32 to the base 30 so that the pedal plate 32 pivots about the pivot connector 42.

The pedal plate 32 has a convex engagement surface 46 that is provided to simulate the sole of a driver's foot engaging the foot pedal 16. The convex shape of the engagement surface 46 provides a line of contact with the foot pedal 16 throughout the entire range of motion of the foot pedal 16 from the non-depressed to the fully depressed position.

A rotary potentiometer 48 is operatively connected between the pedal plate 32 and the base 30 to provide a signal that is representative of the angular inclination of the pedal plate 32 relative to the surface upon which the apparatus is placed. The rotary potentiometer 48 is preferably mounted coaxially with the pivot connector 42.

A linear motion driver 50 is used to move the pedal plate 32 between the non-depressed position and the fully depressed position. The linear motion driver 50 includes a motor 52 that drives a gear reducer 54. The gear reducer 54 connects the motor 52 to a gear drive 56 that extends and retracts the linear motion driver 50.

A tower plate 60 is provided to facilitate adjustment of the measuring apparatus 12. The tower plate 60 defines a vertical slot 62. The tower plate 60 is secured to the base 30 and extends vertically upwardly from the base. An attachment plate 64 is secured to the tower plate 60 by fasteners that extend through the vertical slot 62. The attachment plate 64 may be attached to the tower plate 60 in a range of vertical locations along the slot 62. A hanger 66 is attached to the attachment plate 64 and extends from the attachment plate 64 to the linear motion driver 50. A clamp 68 is provided as part of a hanger 66. The clamp 68 may be loosened to permit the linear motion driver 50 to be moved horizontally towards and away from the foot pedal 16. A bracket 70 is provided to connect the linear motion driver 50 to the load plate 36. The bracket 70 is pivotally connected to the linear motion driver 50 to allow the pedal plate 32 to pivot as it follows movement of the foot pedal 16.

An inclinometer 72, such an inertial inclinometer, can be attached to load plate 36 and indirectly to the pedal plate 32. The inclinometer 72 permits the pedal plate 32 to be set at an initial location corresponding to the design angular orientation of the foot pedal 16.

Referring specifically to FIG. 2, a rotary encoder 76, or string potentiometer, may be attached to the measurement apparatus 12 to measure the scrub or relative movement of the pedal plate 32 relative to the foot pedal 16. The term "scrub" refers to the sliding movement of a driver's shoe as the foot pedal 16 is depressed and released. Ideally, scrub is minimized to prevent wear or driver discomfort. A cable 78 is provided by the rotary encoder 76 that may be extended and retracted as the foot pedal 16 is moved. The cable 78 extends through a cable guide 80. The cable guide 80 is preferably located proximate the pivot connector 42 and is most preferably disposed at a coaxial location relative to the pivot axis of the pivot connector 42. A sleeve 82 may be provided between the rotary encoder 76 and the cable guide 80. The sleeve 82 permits the cable 78 to move freely and allows the rotary encoder 76 to be located at a location that is remote from the cable guide 80. A fixed pin 84 is provided on the pedal plate 32. A distal end 86 of the cable 78 is attached to the fixed pin 84. As the foot pedal 16 is depressed and released, the extent to which the pedal is displaced relative to the cable guide 80 is measured by measuring the linear extent of extension and retraction of the cable 78 from the rotary encoder 76.

A bubble level 88 may be provided on the base 30 to facilitate leveling the measuring apparatus 12. The floor 18 of various vehicles may include grooves, raised areas and other irregular surface features that may make it difficult to set the measurement apparatus 12 in a level position on the floor 18. Position screws, posts, or other adjustment devices may be provided on the base 30 for engaging the floor 18 to level the measurement apparatus 12.

Referring to FIG. 1, a RPM input 90 may be provided from the engine controller 22, CAN BUS, or from a sensor, that provides an input to the testing controller 28 that is indicative of the engine speed. The RPM signal provided by the RPM input 90 may be used to correlate the position signal, and load signal relative to the speed request output signal and RPM input.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Pedal measurement apparatus for a vehicle having a traction motor controlled by an accelerator pedal and a speed request output signal comprising:

a base;

a pedal plate connected to the base at a pivot connector, the pedal plate having a surface that is oriented to engage the accelerator pedal;

a rotary potentiometer operatively connected between the pedal plate and the base that provides an inclination signal representative of an angular position of the pedal;

a load plate attached to a load cell that is attached to the pedal plate;

a linear motion driver that is actuated by a motor and attached to a pedal bracket to move the pedal plate between a retracted position and an extended position, wherein the load plate provides a load signal that is representative of the load applied by the linear motion driver to the pedal plate; and a controller that receives the speed request signal output and correlates the speed request signal output to the inclination signal, and the load signal.

2. The pedal measurement apparatus of claim 1 further comprising an inclinometer attached to the pedal that measures an initial position of the pedal in the retracted position.

3. The pedal measurement apparatus of claim 1 wherein the speed request signal provides a voltage to a traction motor controller that varies based upon the position of the pedal.

4. The pedal measurement apparatus of claim 1 further comprising an adjustment plate attached to the base and extending in a vertical direction above the base, the linear motion driver being attachable to the adjustment plate in a range of vertically spaced positions above the base.

5. The pedal measurement apparatus of claim 4 further comprising a bracket that secures the linear motion driver to the adjustment plate in a range of horizontally spaced positions relative to the pedal bracket.

6. The pedal measurement apparatus of claim 1 further comprising a revolution per minute (RPM) signal representative of a speed of rotation of the traction motor that is obtained from a sensor or CAN BUS source on the vehicle, wherein an RPM signal is provided to the controller to correlate the speed request signal output, the inclination signal, and the load signal to the RPM signal.

7. The pedal measurement apparatus of claim 1 further comprising a rotary encoder having an elongated cable that is extended from the rotary encoder when the pedal plate is driven into engagement with the accelerator pedal and retracted from the rotary encoder when the pedal plate is withdrawn from the accelerator pedal, a distal end of the elongated cable is attached to a fixed point on the pedal plate, a cable guide is attached to a base plate proximate the pivot connector, wherein the rotary encoder measures the distance that the cable is extended or retracted as the pedal plate is moved from an initial position to a wide open position and provides a scrub signal.

8. The pedal measurement apparatus of claim 7 further comprising a sleeve attached to the base for guiding the cable from the rotary encoder to the cable guide.

9. A method of measuring ergonomic parameters relating to a foot pedal in a vehicle with a portable measurement apparatus having a base, a pedal plate pivotally connected to the base that includes a pedal plate having a surface that is oriented to engage the foot pedal, a rotary potentiometer operatively connected between the pedal plate and the base that provides an inclination signal, a load plate attached to at least one load cell that is attached to the pedal plate, a linear motion driver that is actuated by a motor and attached to a pedal bracket to move the pedal plate between a retracted position and an extended position, wherein the load plate provides a load signal that is representative of the load applied by the linear motion driver to the pedal plate, and a controller that receives a speed request signal output and correlates the speed request signal output to the inclination signal, and the load signal, the vehicle having a floor and a traction motor, the method comprising:

placing the measurement apparatus on the floor of the vehicle;

placing the pedal plate into engagement with the foot pedal and adjusting an angular orientation of the pedal plate to be parallel to the foot pedal;

connecting the speed request output signal to the controller; and actuating the linear motion driver to move the foot pedal from a non-depressed position to a fully depressed position, providing the load signal and the inclination signal to the controller from the at least one load cell as the foot pedal is moved.

10. The method of claim 9 wherein the measurement apparatus further comprises a rotary encoder having an elongated cable that is extended from the rotary encoder when the pedal plate is driven into engagement with the foot pedal and retracted from the rotary encoder when the pedal plate is withdrawn from the foot pedal, a distal end of the elongated cable is attached to a fixed point on the pedal plate, and a cable guide is attached to a base plate proximate a pivot connector, wherein the method further comprises:

measuring a distance that the cable is extended or retracted as the pedal plate is moved from the non-depressed position to the fully depressed position to provide a scrub measurement value.

11. The method of claim 9 wherein the measurement apparatus further includes an inclinometer attached to the pedal, and the method further comprises measuring an angular orientation of the pedal in the non-depressed position.

12. The method of claim 9 wherein the step of placing the measurement apparatus on the floor of the vehicle further comprises leveling the measuring apparatus before the step of actuating the linear motion driver.

\* \* \* \* \*